US012026635B1

(12) United States Patent
Camp et al.

(10) Patent No.: US 12,026,635 B1
(45) Date of Patent: Jul. 2, 2024

(54) EVENT IMAGE INFORMATION RETENTION

(71) Applicant: Amazon Technologies, Inc., Seattle, WA (US)

(72) Inventors: Wyatt David Camp, Seattle, WA (US); Dilip Kumar, Seattle, WA (US); Amber Autrey Taylor, Seattle, WA (US); Jason Michael Famularo, Seattle, WA (US); Thomas Meilandt Mathiesen, Seattle, WA (US); Jared Joseph Frank, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 17/340,817

(22) Filed: Jun. 7, 2021

Related U.S. Application Data

(62) Division of application No. 14/313,426, filed on Jun. 24, 2014, now Pat. No. 11,030,541.

(51) Int. Cl.
*G06N 5/04* (2023.01)
*G06F 16/11* (2019.01)
*G06N 5/048* (2023.01)

(52) U.S. Cl.
CPC .......... *G06N 5/048* (2013.01); *G06F 16/125* (2019.01)

(58) Field of Classification Search
None
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |

(Continued)

FOREIGN PATENT DOCUMENTS

| WO | WO-2004013737 A2 * | 2/2004 | ........... G06Q 20/105 |
| WO | WO-2007030168 A1 * | 3/2007 | ......... G06K 9/00718 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Alan Chen
(74) *Attorney, Agent, or Firm* — Athorus, PLLC

(57) ABSTRACT

Described is a system and method for proactively determining and resolving events having low confidence scores and/or resolving disputed events. For example, when an event, such as a pick of an item from an inventory location within a materials handling facility occurs, the event aspects (e.g., user involved in the event, item involved in the event, action performed) are determined based on information provided from one or more input components (e.g., camera, weight sensor). If each event aspect cannot be determined with a high degree of confidence, the event information is provided to an associate for resolution.

20 Claims, 12 Drawing Sheets

(56) References Cited

U.S. PATENT DOCUMENTS

| | | | |
|---|---|---|---|
| 8,817,094 B1 * | 8/2014 | Brown | G08B 13/19667 |
| | | | 348/143 |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0284132 A1 | 11/2012 | Kim et al. | |
| 2012/0321146 A1 | 12/2012 | Kundu et al. | |
| 2013/0027561 A1 | 1/2013 | Lee et al. | |
| 2013/0076898 A1 | 3/2013 | Philippe et al. | |
| 2013/0208966 A1 | 8/2013 | Zhao et al. | |
| 2013/0222133 A1 | 8/2013 | Schultz et al. | |
| 2013/0250115 A1 | 9/2013 | Fan et al. | |
| 2013/0253700 A1 | 9/2013 | Carson et al. | |
| 2014/0279294 A1 | 9/2014 | Field-Darragh et al. | |
| 2014/0313330 A1 * | 10/2014 | Carey | G08B 13/19613 |
| | | | 348/143 |
| 2014/0362223 A1 | 12/2014 | LaCroix et al. | |
| 2015/0012396 A1 | 1/2015 | Puerini et al. | |
| 2015/0019391 A1 | 1/2015 | Kumar et al. | |
| 2015/0073907 A1 | 3/2015 | Purves et al. | |
| 2015/0310601 A1 | 10/2015 | Rodriguez et al. | |
| 2015/0319352 A1 | 11/2015 | Donovan et al. | |
| 2015/0350902 A1 * | 12/2015 | Baxley | H04W 4/90 |
| | | | 726/7 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

EVENT IMAGE INFORMATION RETENTION

PRIORITY CLAIM

This application is a Divisional of U.S. patent application Ser. No. 14/313,426, filed Jun. 24, 2014, and titled "Proactive Resolution Of Event Information," the contents of which are herein incorporated by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in an inventory area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
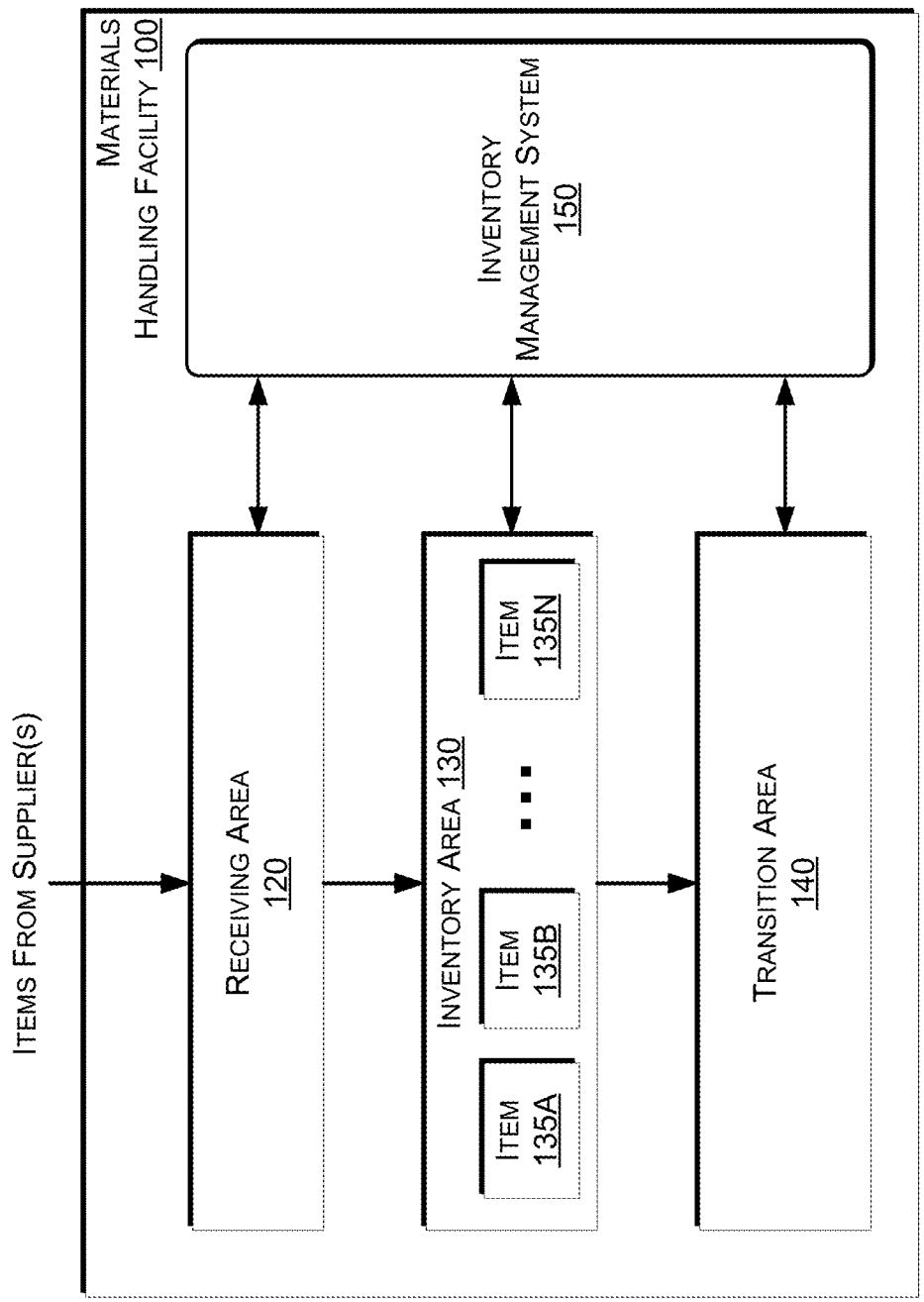
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for proactively determining and resolving events having low confidence scores and/or resolving disputed events. For example, when an event, such as a pick of an item from an inventory location within a materials handling facility occurs, the event aspects (e.g., user involved in the event, item involved in the event, action performed) are determined based on information provided from one or more input components (e.g., camera, weight sensor). For each determined event aspect, a confidence score is provided representing the degree of confidence that the event aspect has been properly determined. If the confidence score does not exceed a threshold, event information regarding the event may be provided to an associate for resolution. The associate may review the provided event information and resolve the event, thereby ensuring that the proper event is associated with the correct user. Event resolution may be performed at or near-real-time of the event occurrence so that any remaining event issues may be resolved while the user is located in the materials handling facility.

In addition to proactively resolving events, the system may determine which event information is to be retained and a retention period for retaining event information. For example, if a user has performed events within a materials handling facility and is departing the materials handling facility, rather than keeping all the corresponding event information, it may be determined what event information is to be retained and for how long (retention period) the event information is to be retained. By selectively retaining event information, rather than all event information, the storage capacity needed is greatly reduced. Event information may be retained based on the user's profile, the item involved in the event, the location of the event within the materials handling facility, etc.

In still other implementations, event information may be aggregated to identify commonalities and sources of the commonalities. For example, events having low confidence scores for one or more event aspects and/or disputed events may be aggregated to identify commonalities between the events. Event commonalities may be used to modify algorithms for determining event aspects and/or to reconfigure the materials handling facility to reduce the occurrence of disputed events.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
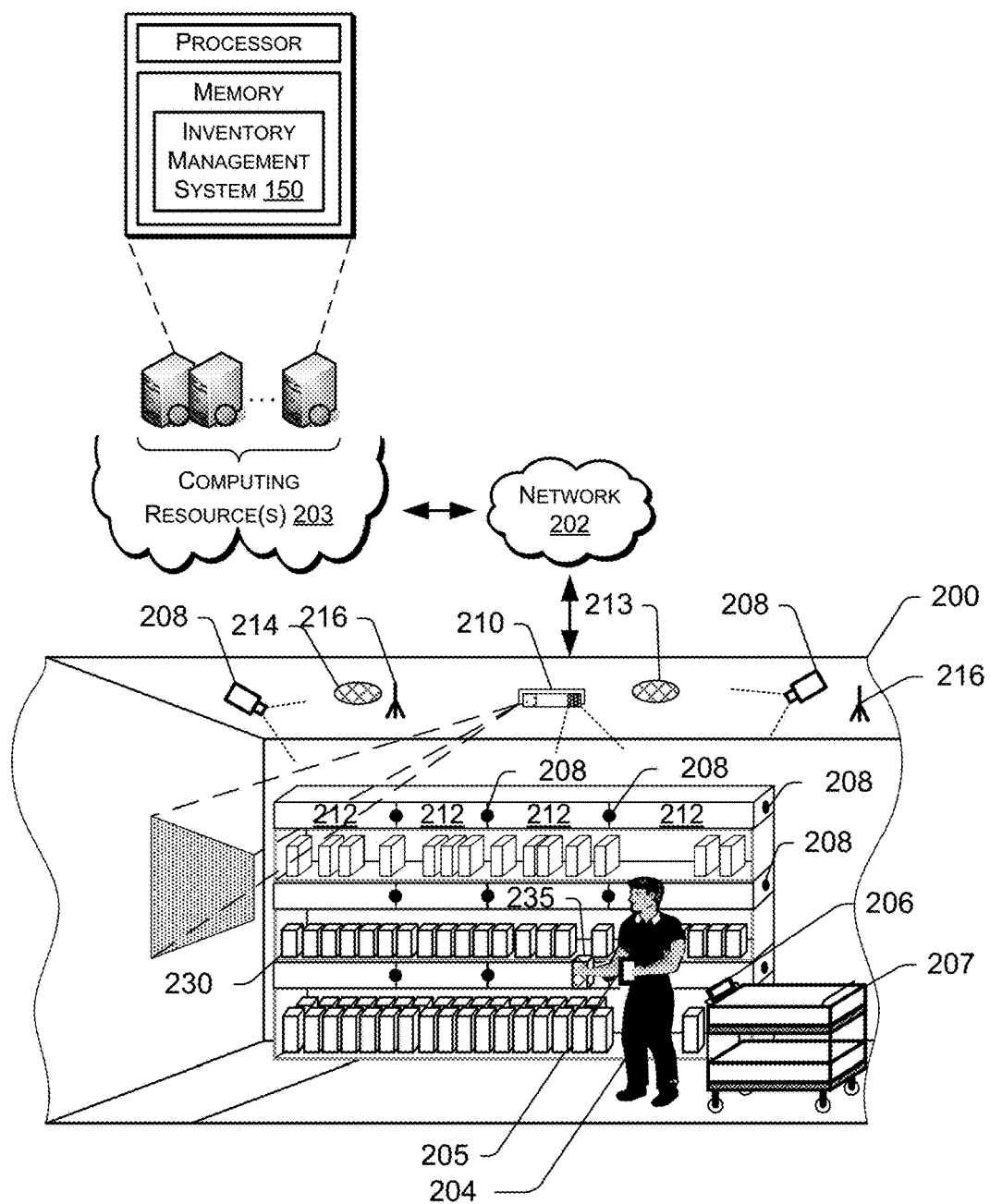
FIG. 2 shows additional components of the materials handling facility of FIG. 1, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, active tag readers, etc., may be utilized with the implementations described herein. For example, a pressure sensor and/or a scale may be used to detect when an item is added and/or removed from inventory areas. Likewise, a light curtain may be positioned to cover the front of an inventory area and detect when an object (e.g., a user's hand) passes into or out of the inventory area. The light curtain may also include a reader, such as an active tag reader, that can detect a tag included on an item as the item passes into or out of the inventory location. For example, if the item includes an RFID tag (an active tag), a RFID reader (active tag reader) may detect the RFID as the item passes into or out of the inventory location.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204 and/or any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200, receive confirmation that the inventory management system 150 has correctly identified items that are picked and/or placed by the user, receive requests for confirmation regarding one or more event aspects, etc. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolley, etc. In some implementations, the tote 207 may include a device or display 206, which may be configured in a manner similar to the portable device 205. For example, the display 206 may include a touch-based display, a memory, processor, speakers, wireless network connectivity, etc. In other implementations, the tote 207 may include one or more embedded output devices. For example, the tote 207 may include illumination elements, speakers, actuators, etc., incorporated into the tote that may be activated using the implementations discussed herein.

As discussed further below, event information and/or user interfaces may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 and/or display 206 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user picks an item 235 from an inventory area 230, the inventory management system 150 may receive information, such as a load cell change, an image of the user, and/or an image of the performed action (item pick from the inventory area), identifying that an item has been picked from the inventory area 230. The event aspects (user identity, action performed, item involved in the event) may then be determined and the inventory management system 150 may send a user interface and/or information to the portable device 205 for presentation to the user 204. If the inventory management system cannot determine any of the event aspects with a high enough degree of confidence, the event information may be sent to an associate for resolution before the user interface is provided to the user. The event information may include, for example, a log file of the information collected by the input components (e.g., change in load cell), the events aspects as determined by the inventory management system, images and/or video of the event, etc.

In other implementations, the event information may be provided to the associate for resolution and a user interface may be sent for presentation to the user that includes a request that the user confirm one or more of the event aspects. For example, if the user 204 picks an item from the inventory area 130 (FIG. 1), images of the user, the action, the item, and/or other inputs (e.g., weight change at the inventory location) are received and processed to determine each event aspect. In this example, the action and the user are determined with a high degree of confidence. However, the confidence score corresponding to the picked item may be low. In such an example, event information (e.g., weight change, inventory location, user, action, images of the event) may be provided to an associate for resolution/confirmation of the event aspects.

Figure 3:
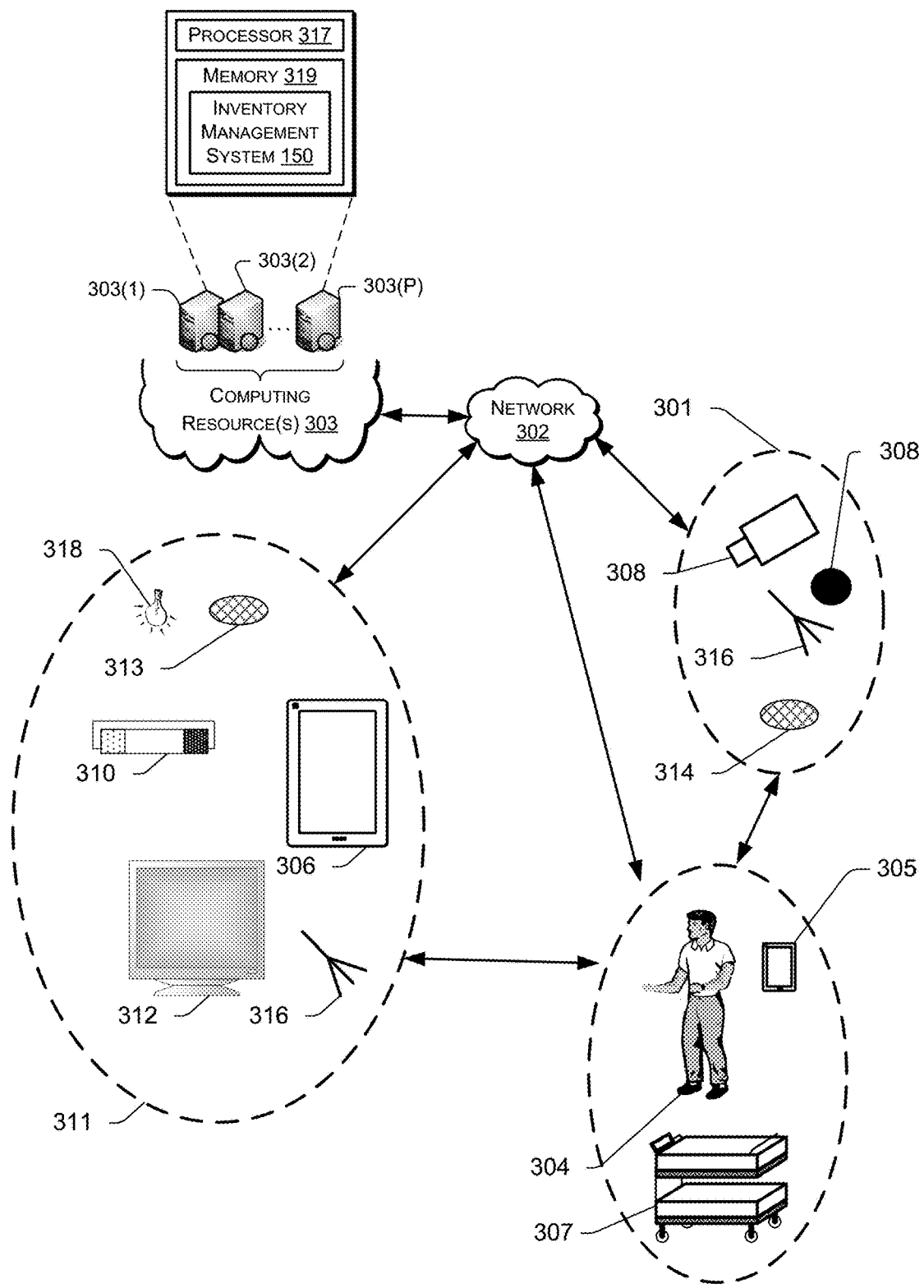
FIG. 3 shows components and communication paths between component types utilized in a materials handling facility of FIG. 1, according to one implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), ..., 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 303 may process images of users 304 to identify the user 304, process images of items to identify items, determine a location of items and/or determine a position of items. The server system(s) 303 do not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
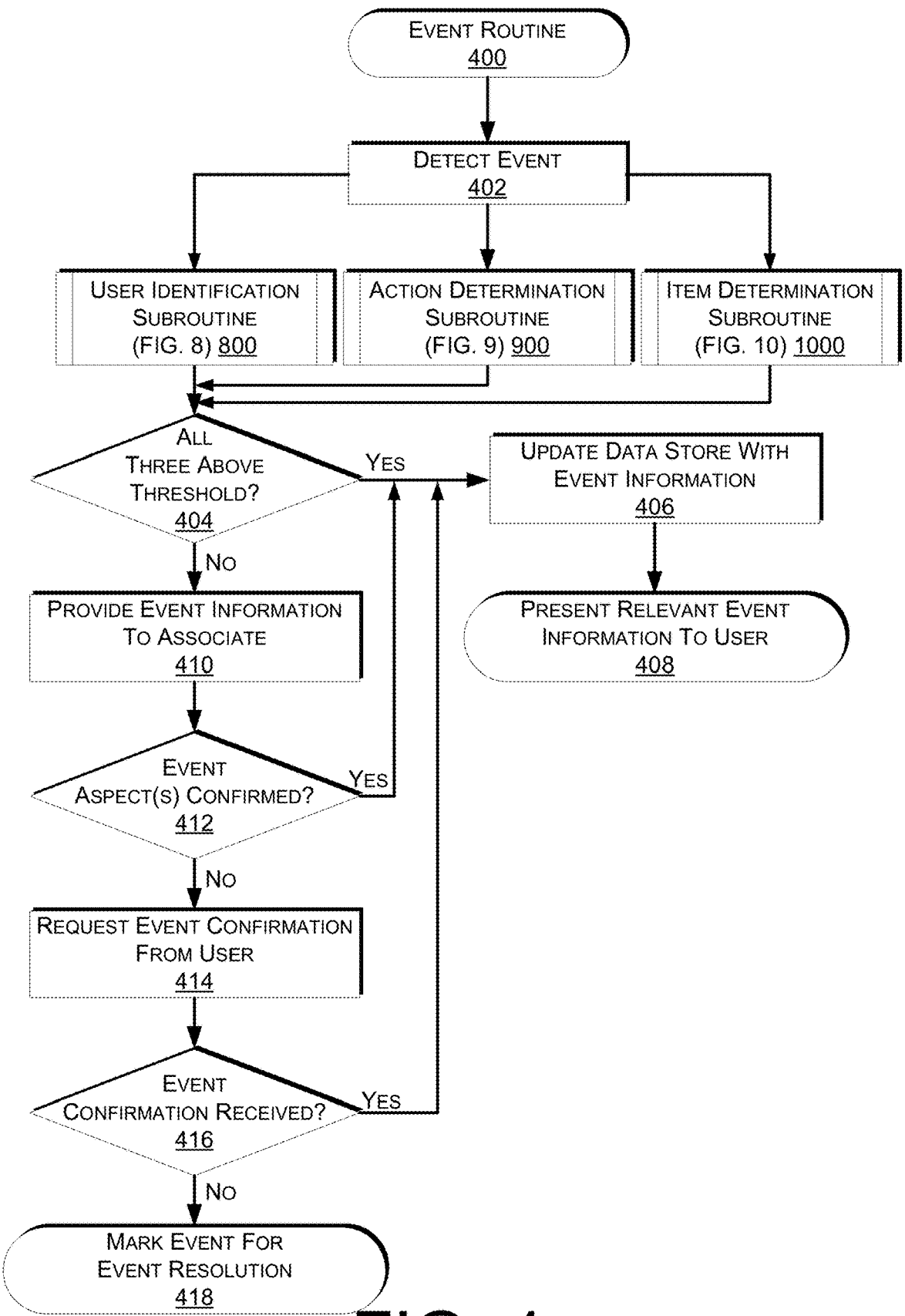
FIG. 4 is a flow diagram of an example event routine, according to one implementation.

FIG. 4 is a flow diagram of an example event routine, according to one implementation. The example routine of FIG. 4 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example event routine 400 begins upon the detection of an event, 402. An event may be an activity within a materials handling facility. For example, an event may include a user picking an item from an inventory location, a user placing an item at an inventory location, a user placing an item into a tote or a user picking an item from a tote. An event may be detected by an inventory management system based on a change to one or more inputs within the materials handling facility. For example, if a scale, pressure sensor, etc., determines a change in a weight at the inventory location, an event may be detected. Likewise, if an image captured by an image capture device within the materials handling facility is processed and it is determined that an item has been picked from a tote, an event may be determined.

In each event there are event aspects, such as, an action (item pick from an inventory location, item place at an inventory location, item place into a tote, item pick from a tote), a user that performed the event, an item involved in the event, etc. Upon detection of an event, each of the user identification subroutine 800 (FIG. 8), action determination subroutine 900 (FIG. 9), and item determination subroutine 1000 (FIG. 10) are performed. As discussed further below, the user identification subroutine 800 determines an identity of the user involved in the event and a user identification confidence score representing a confidence that the user has been properly identified. The action determination subroutine 900 determines the action performed by the user and an action determination confidence score representing a confidence that the action has been properly determined. The item determination subroutine 1000 determines the item involved in the event and an item determination confidence score representing a confidence that the item has been properly determined.

Upon completion of each of the user identification subroutine 800, the action determination subroutine 900 and the item determination subroutine 1000, a determination is made as to whether all three of the returned confidence scores exceed a respective threshold, as in 404. For example, the inventory management system may maintain a user identification threshold, an action determination threshold and an item determination threshold, each of which must be exceeded by the respective confidence score before the returned result is determined to be accurate.

The thresholds may be any defined value and the different thresholds may be different or the same values. Likewise, one or more of the thresholds may vary depending on one or more of the item, the action, the user, the time of day, the number of users in the materials handling facility and/or other factors. For example, the user identification threshold may be lower if the user is alone in an aisle when the event is performed. In comparison, if there are multiple users in the aisle, the user identification threshold and/or other thresholds, may be higher because there is a higher potential for error.

If a confidence score exceeds a threshold, it is determined that the corresponding event aspect (item/user/action) has been properly determined. For example, if the item determination confidence score returned with the item identifier exceeds the item determination threshold, it may be determined that the item has been properly identified. However, if the item determination confidence score returned with the item identifier does not exceed the item determination threshold, it may be determined that associate and/or user verification of the item is to be obtained.

If it is determined that all three of the confidence scores exceed the respective thresholds, a data store that maintains event information is updated to include the determined event information, as in 406. For example, a data store may be utilized to maintain log information about aspects of events. The stored information may be used for analytical and/or resolution purposes. For example, all event information corresponding to a particular location within a materials handling facility may be aggregated to determine if any inefficiencies exist at that location (e.g., frequent low confidence scores relating to one or more event aspects).

In addition to updating a confidence data store, a user interface that identifies the determined action and the determined item is generated and sent to a device for presentation to the identified user, as in 408. For example, a user interface that includes a representation of the item involved in the event and an identification of the determined action may be sent to a portable device associated with a user, thereby providing visual confirmation to the user that the proper item and action have been determined by the inventory management system.

If it is determined that not all of the confidence scores exceed their respective thresholds, event information corresponding to the event is provided to an associate for resolution, as in 410. Event information may include any information about an event. For example, the event information may include the information provided by each of the subroutines 800, 900, 1000, information provided by the input device(s) that detected the event, images captured by image capture devices of the event, etc. Likewise, the associate may be local or remote from the inventory management system. In some implementations, the event information may be provided to multiple associates simultaneously so that the first associate that is available can review and resolve/confirm the event.

In some implementations, only event information necessary for resolving the event may be provided to the associate. For example, if the user identification subroutine determines the user with a high degree of confidence, the action determination subroutine determines the action with a high degree of confidence, but the item determination subroutine cannot determine the item with a high degree of confidence, only event information necessary for determining the item may be provided to the associate. For example, images of the item involved in the action, past pick history of the determined user, and/or a determined weight of the item may be provided to the associate for use in determining the item involved in the event. In such an example, the determined identity of the user may not be provided to the associate as the user's identity is not necessary for determining the item involved in the event.

A determination is then made as to whether the associate has confirmed or identified the uncertain event aspect(s), as in 412. If it is determined that the associate has confirmed or identified the uncertain event aspect(s), the example routine 400 returns to block 406 and continues. However, if the associate is not able to confirm or identify the uncertain event aspect(s), a request for user confirmation may be generated and provided to the user requesting that the user confirm or identify one or more aspects of the event, as in 414. For example, if the user involved in the event cannot be determined with a high degree of confidence and the associate is not able to confirm the identity of the user, the associate and/or the user identification subroutine 800 may identify potential users involved in the event. A request for user confirmation may be generated and sent to each of the potential users asking that the user involved in the event confirm their identity.

If an event confirmation is received from a user, as in 416, the example routine returns to block 406 and continues. However, if the user(s) does not confirm or identify the uncertain aspect(s) of the event, the event is marked for event resolution, as in 418. An example event resolution routine is discussed further below with respect to FIGS. 5A-5B. By providing event information to an associate when one or more event aspects cannot be determined with a high degree of confidence allows the event to be efficiently determined and presented to the user with minimal delay and without interrupting the user. The associate(s) may resolve any uncertainties and the confirmed/identified event information provided to the user to confirm that the inventory management system has correctly identified the event, without the user having to know that any associate involvement has occurred.

Figure 5A:
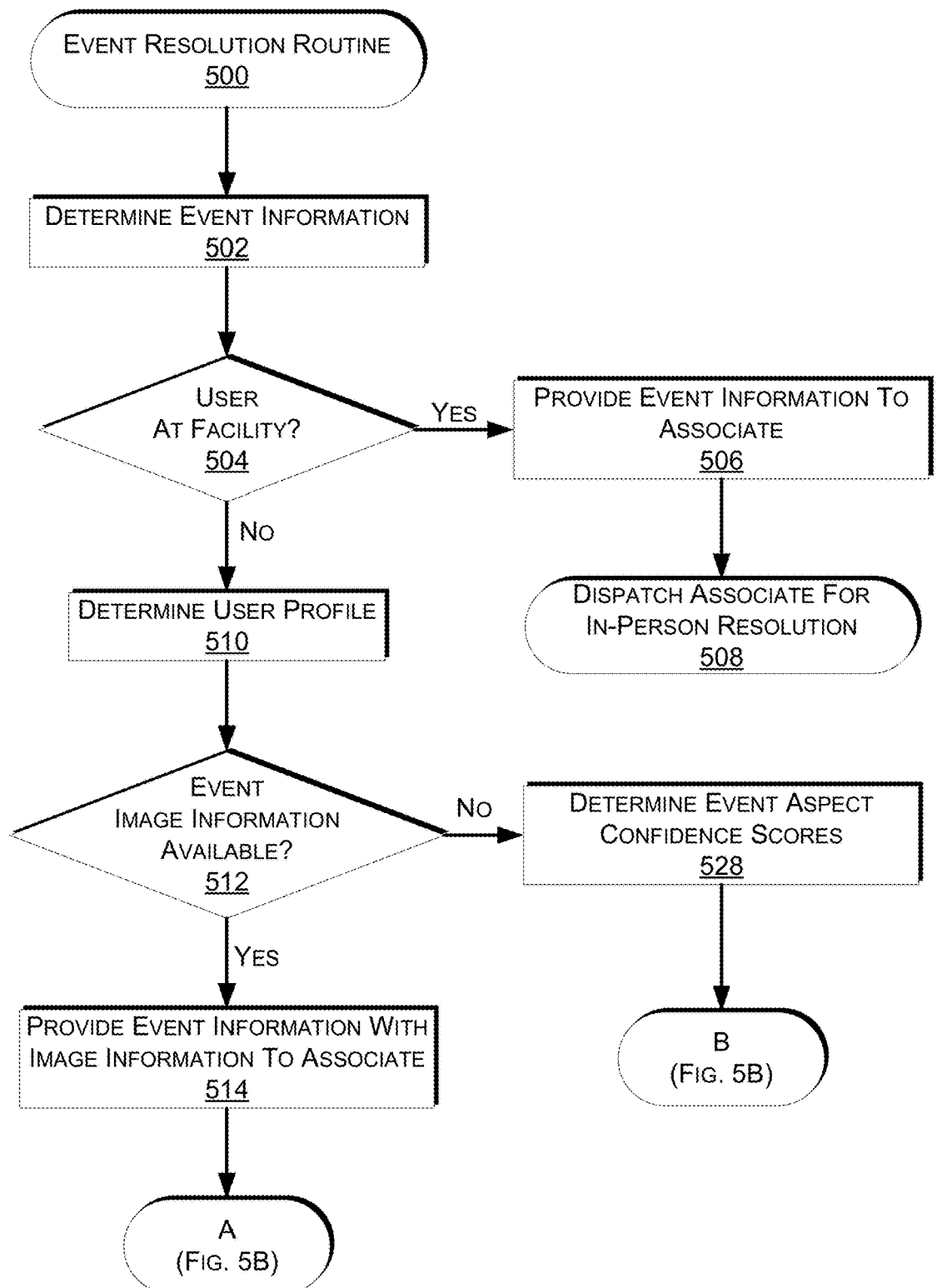
FIGS. 5A-5B is a flow diagram of an example event resolution routine, according to one implementation.
Figure 5B:
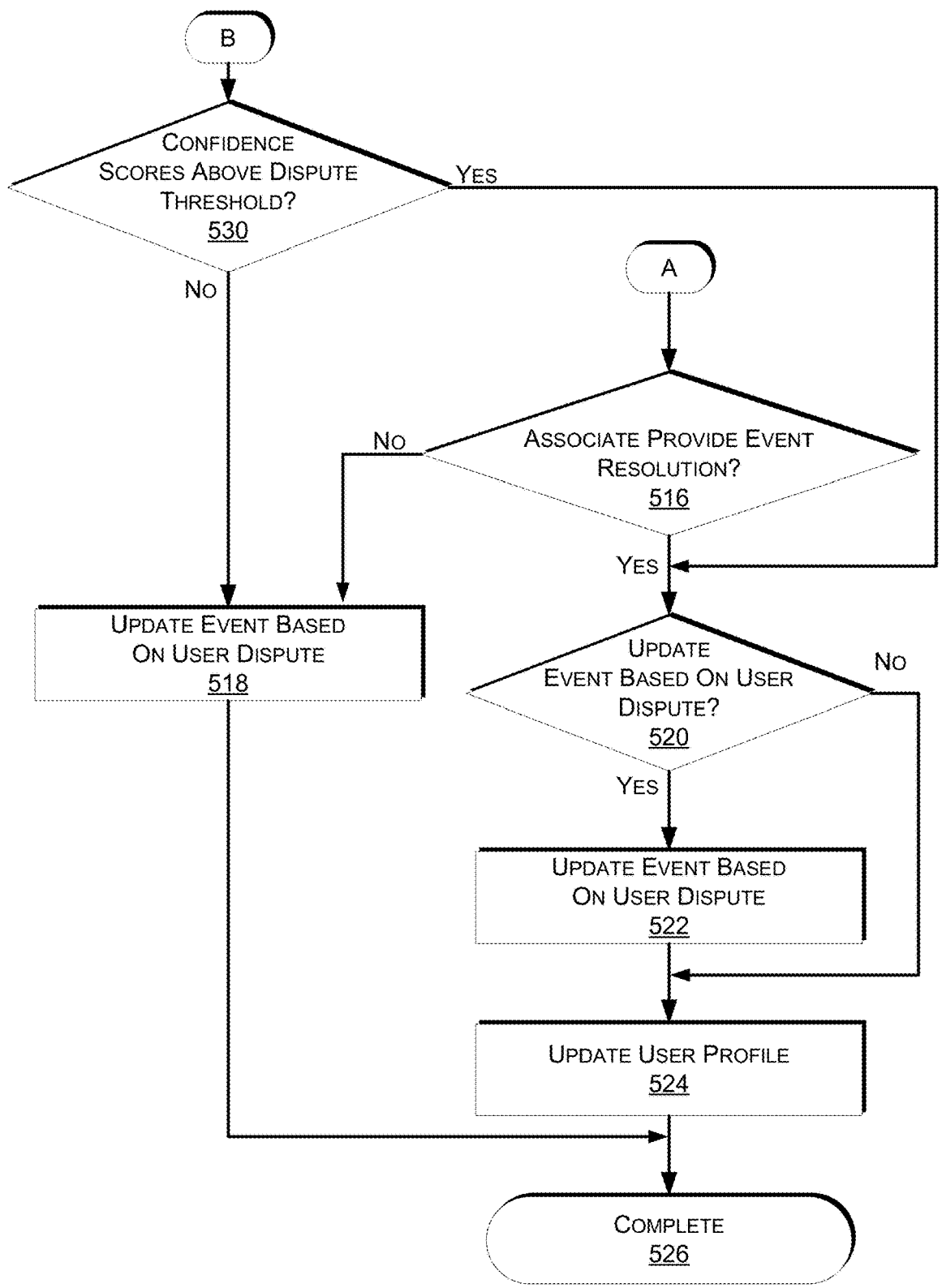

FIGS. 5A-5B is a flow diagram of an example event resolution routine 500, according to one implementation. The example event resolution routine may be performed any time one or more aspects of an event cannot be determined as part of the example event routine 400 (FIG. 4), if it is determined that there are outstanding event resolutions when a user is departing the materials handling facility, as discussed below with respect to FIG. 6, and/or in response to a user disputing an event. A user may dispute an event at any time (referred to herein as an "event dispute"). For example, while the user is located in the materials handling facility, they may review the item identifier list associated with the user that identifies each item determined to have been picked by the user and placed in the user's tote, and dispute one or more of the items and/or events. Likewise, a user, at some time after departing the materials handling facility, may dispute one or more of the items identified on the item identifier list associated with the user. For example, the user may call a customer service associate affiliated with the materials handling facility stating that they did not pick one or more of the items identified on the item identifier list, that an item was damaged, etc.

Turning first to FIG. 5A, the example event resolution routine 500 begins by determining event information corresponding to an event that is to be resolved, as in 502. For example, if the user is disputing an event, the event information corresponding to the disputed event may be determined and obtained from the data store. Likewise, if an associate is unable to resolve an event (FIG. 4), the event information corresponding to the event may be determined and obtained.

In addition to obtaining the event information, a determination is made as to whether the user is still located at the materials handling facility, as in 504. If it is determined that the user is located at the materials handling facility, the relevant event information may be provided to an associate, as in 506. As discussed above, in some implementations, only the information needed for event aspect resolution may be provided to the associate. Likewise, the associate may be dispatched to the location of the user within the materials handling facility to provide an in-person resolution of the dispute, as in 508. For example, if the associate that reviewed the event information as part of the event routine of FIG. 4 cannot confirm or identify each aspect of the event, it may be necessary to have an associate that is local to the materials handling facility provide an in-person review and resolution of the event. Likewise, if the user is disputing one or more events, an in-person associate may be able to provide assistance to resolve the dispute.

Because events with low confidence scores are resolved in near-real time (while the user is located at the materials handling facility), event resolutions occurring after a user has left the materials handling facility are generated in response to a user disputing an event. If it is determined at decision block 504, that the user is not located at the materials handling facility, a user profile associated with the user is determined, as in 510. The user profile may provide past history on the user, such as how often they dispute events, how often they have picked the item that is now being disputed, etc.

A determination may also be made as to whether the event information relating to the event includes event image information, as in 512. As discussed below, some or all of the event information corresponding to an event may be deleted or otherwise removed after the user departs the materials handling facility and/or after a retention period has passed. If it is determined that the event information includes event image information, the event information, including the event image information, is provided to an associate for review, as in 514. An associate reviewing a disputed event may provide a confidence score representative of how confident the associate is that the determined event aspects are correct.

Turning to FIG. 5B, a determination is then made as to whether the associate has provided a resolution to the disputed event, as in 516. For example, the associate may review the event information, including the image information, and provide an event resolution identifying the aspects of the event as determined by the associate from the event information. If the associate cannot determine the aspects of the event from a review of the event information (including the image information), the associate may not provide an event resolution.

If it is determined that the associate has not provided an event resolution, the event information stored in the data store is updated based on the user dispute, as in 518. For example, if the user is disputing the quantity of an item picked from an inventory location, stating they only picked two items but the event information identifies that three items were picked, the event information is updated to identify a picked quantity of two, i.e., the event information is updated to correspond to a user request included in the event dispute.

If it is determined that the associate has provided an event resolution, a determination is made as to whether the event information should still be updated based on the user dispute, as in 520. For example, even if the associate is able to confirm with a high degree of confidence that the event information is accurate, it may still be determined (e.g., to provide a good customer experience) that the event information is to be updated based on the user's dispute. If it is determined that the event information is to be updated based on the user dispute, the event information is updated, as in 522. After updating the event information at block 522, or if it is determined at decision block 520 that the event information is not to be updated, the user profile associated with the user is updated, as in 524. The user profile may be updated to identify that the user has disputed an event that has been determined with a high degree of confidence to have occurred. The updated user profile may have a future impact on the dispute threshold discussed above, and/or other aspects. The example routine 500 then completes, as in 526.

Returning to FIG. 5A, if it is determined at decision block 512 that the event image information is not available, the event aspect confidence scores are determined (e.g., from the stored event information), as in 528. Returning again to FIG. 5B, based on the event aspect confidence scores, a determination is made as to whether the confidence scores are above a dispute threshold, as in 530. The dispute threshold may be any defined threshold that must be exceeded before the user dispute is denied. The dispute threshold may be different for different users, for different items and/or for different events. For example, if the user frequently disputes events, the dispute threshold may be lower as there is a potential probability of fraud. However, if the user rarely disputes events and/or frequently utilizes the materials handling facility, the dispute threshold may be higher. In a similar manner, if the item involved in the disputed event is a low value item, the dispute threshold may be higher.

If it is determined that all of the confidence scores are above the dispute threshold, the example routine 500 proceeds to decision block 520 and continues. However, if it is determined that one or more of the confidence scores does not exceed the dispute threshold, the example routine 500 proceeds to block 518 and continues. In some implementations, rather than comparing each confidence score of the corresponding event aspects to the dispute threshold, an overall event confidence score may be determined and compared to the dispute threshold at decision block 530. For example, an overall confidence score may be determined based on an aggregate of the individual event aspect confidence scores for the event.

Figure 6:
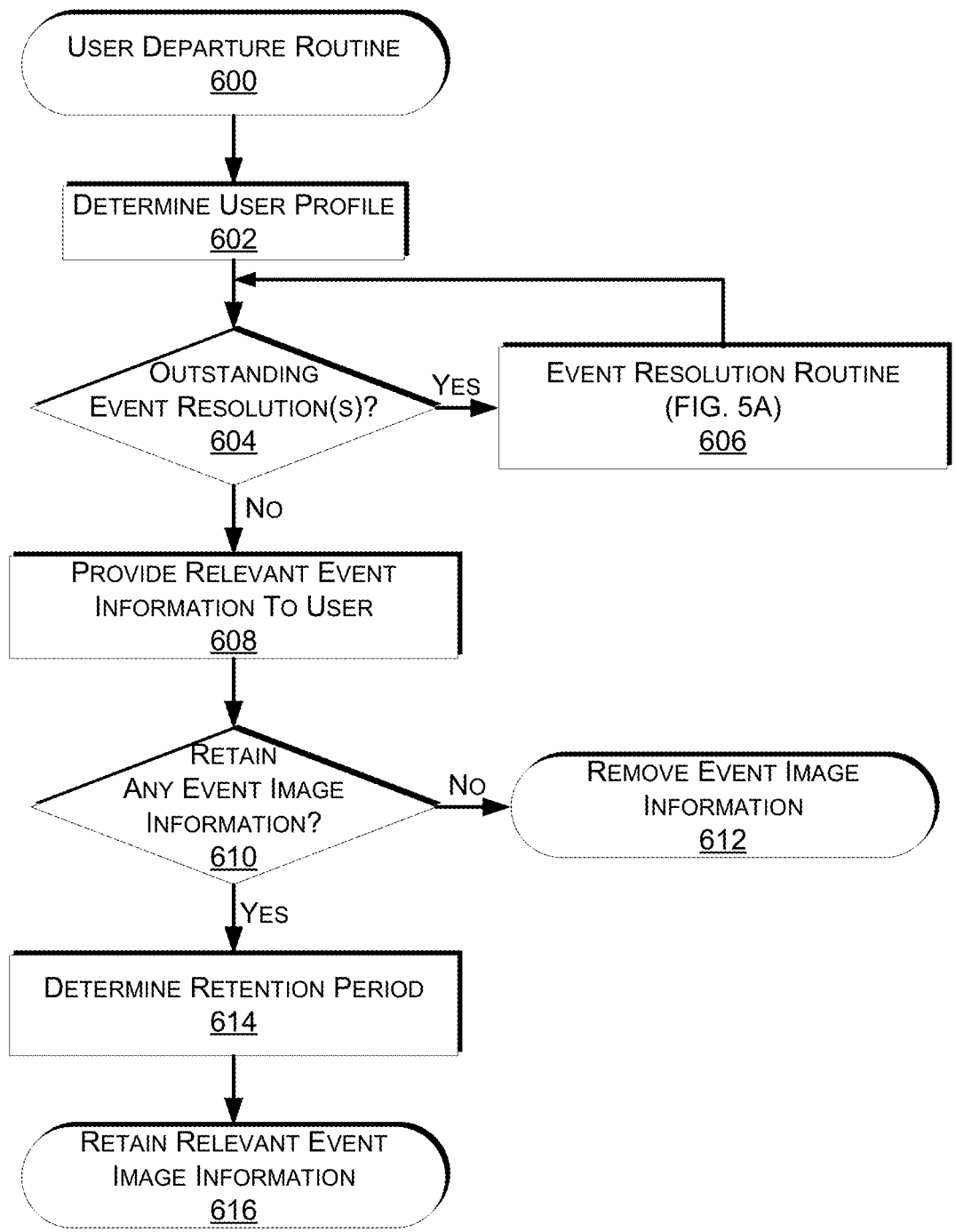
FIG. 6 is a flow diagram of an example user departure routine, according to one implementation.

FIG. 6 is a flow diagram of an example user departure routine 600, according to one implementation. The example routine 600 begins by determining a user profile associated with the user determined to be departing the materials handling facility, as in 602. As discussed above, a user may be identified using a variety of techniques. Once identified, the user profile associated with the user may be determined.

A determination is also made as to whether any outstanding event resolutions exist that are associated with the user and the events performed while located in the materials handling facility, as in 604. As discussed above with respect to FIG. 4, if an associate cannot confirm an event and the user does not provide an event confirmation, an event may be marked for event resolution. An event marked for event resolution may require an associate to be dispatched to the location of the user for resolution, as discussed above with respect to FIGS. 5A-5B. An event resolution may be outstanding for a user determined to be departing the facility if the example routine of FIGS. 5A-5B has not completed with respect to that event. If it is determined that an event resolution remains outstanding, the example routine 500 is performed. In some implementations, because the user is determined to be departing the facility, the example routine may be prioritized and an associate located near a departure area and/or near the user may be provided the event information to assist in resolving the event.

If it is determined that no outstanding event resolutions remain, relevant event information is provided for presentation to the user, as in 608. For example, when a user is determined to be departing the materials handling facility, an item identifier list identifying each item picked by the user and placed into the user's tote or otherwise associated with the user may be provided to the user.

A determination may also be made as to whether any of the event image information corresponding to events performed by the user while located in the materials handling facility are to be retained, as in 610. Event image information for one or more events may be retained for a variety of reasons. For example, if the user profile associated with the user identifies that the user frequently disputes events after leaving the materials handling facility, event image information for events performed by the user may be retained. In another example, if an item involved in an event is a high value item, it may be determined that event image information corresponding to the event that involved the high value item is to be retained. In still another example, any events that required input from an associate to determine one or more event aspects may have the event image information retained. Event image information for events requiring associate input may be retained for use in event information feedback (FIG. 7) and/or for use if the event is later disputed by the user.

If it is determined that event image information is not to be retained, the event image information is removed from the data store, as in 612. In some implementations, the event image information may be removed from memory. In other implementations, the memory containing the event image information may be flagged as available but the event image information may not be removed unless the memory is utilized to store other information.

If it is determined that event image information is to be retained for one or more events, a retention period is determined for the event image information to be retained, as in 614. The retention period may be any defined period for event image information retention. In some implementations, the retention period may be indefinite. In other implementations, it may be based on the item, the user profile of the user, the expiration date of the item, etc.

Finally, the event image information to be retained is stored in a data store managed by the inventory management system for the determined retention period, as in 616.

Figure 7:
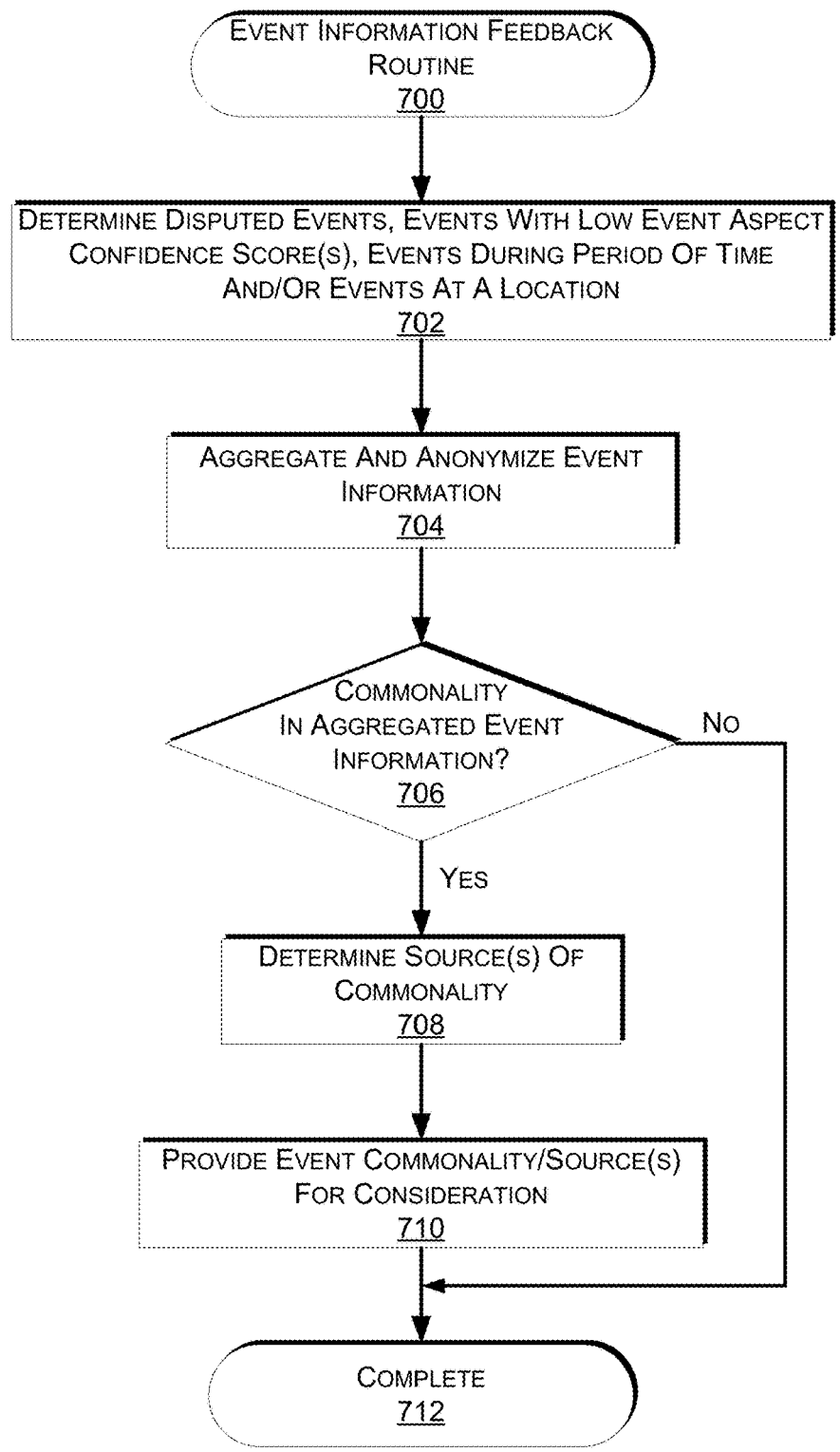
FIG. 7 is a flow diagram of an example event information feedback routine, according to one implementation.

FIG. 7 is a flow diagram of an example event information feedback routine 700, according to one implementation. The example routine 700 begins by determining disputed events, events with low event aspect confidence scores, events during a defined period of time and/or events at a defined location within the materials handling facility, as in 702. The event aspect confidence scores may be those that were initially determined before an associate provided input. A location within the materials handling facility may be any location that is of interest for obtaining information feedback. For example, the location may be a particular inventory area within the materials handling facility.

The determined events are then aggregated and anonymized to remove any user identifying information, as in 704. By aggregating and anonymizing event information, the results can be provided to associates and/or other entities without exposing any user identifiable information.

Based on the aggregated information, a determination may be made as to whether there are any commonalities in the aggregated information, as in 706. A commonality may be any aspects or features of the events that occur a determined number of times. For example, a pick of an item (e.g., Item A) that occurs at a particular location 25% of the time from the aggregated events may be considered a commonality. As another example, identification of a particular item (e.g., Item B) requiring associate input 30% of the time may be considered a commonality.

If it is determined that there are one or more commonalities in the aggregated information, a source of the commonality is determined, as in 708. Continuing with the above example of needing associate input to identify the item, the commonality may be the need for associate input to identify an item. The source of the commonality may be the item (e.g., Item A). In some implementations, the source may be a combination of sources. For example, the commonality may be the need for associate input to identify an item. The source may be the item (e.g., Item A) when located at a particular inventory location (e.g., inventory location 2). The source of the commonality may be determined by further processing of the aggregated information and/or by processing other, similar event information. For example, it may be quickly determined that one source of the commonality of needing associate input is the item, but further processing of the aggregated event information may reveal that the commonality only occurs when the item is at a particular location.

Once determined, the source(s) of the commonality is provided for consideration, as in 710. For example, an associate may be provided with a list of commonalities and corresponding sources resulting from the aggregation of the event information. After providing the event commonalities and/or sources, or if it is determined that there are no commonalities in the aggregated event information, the example routine 700 completes, as in 712.

Figure 8:
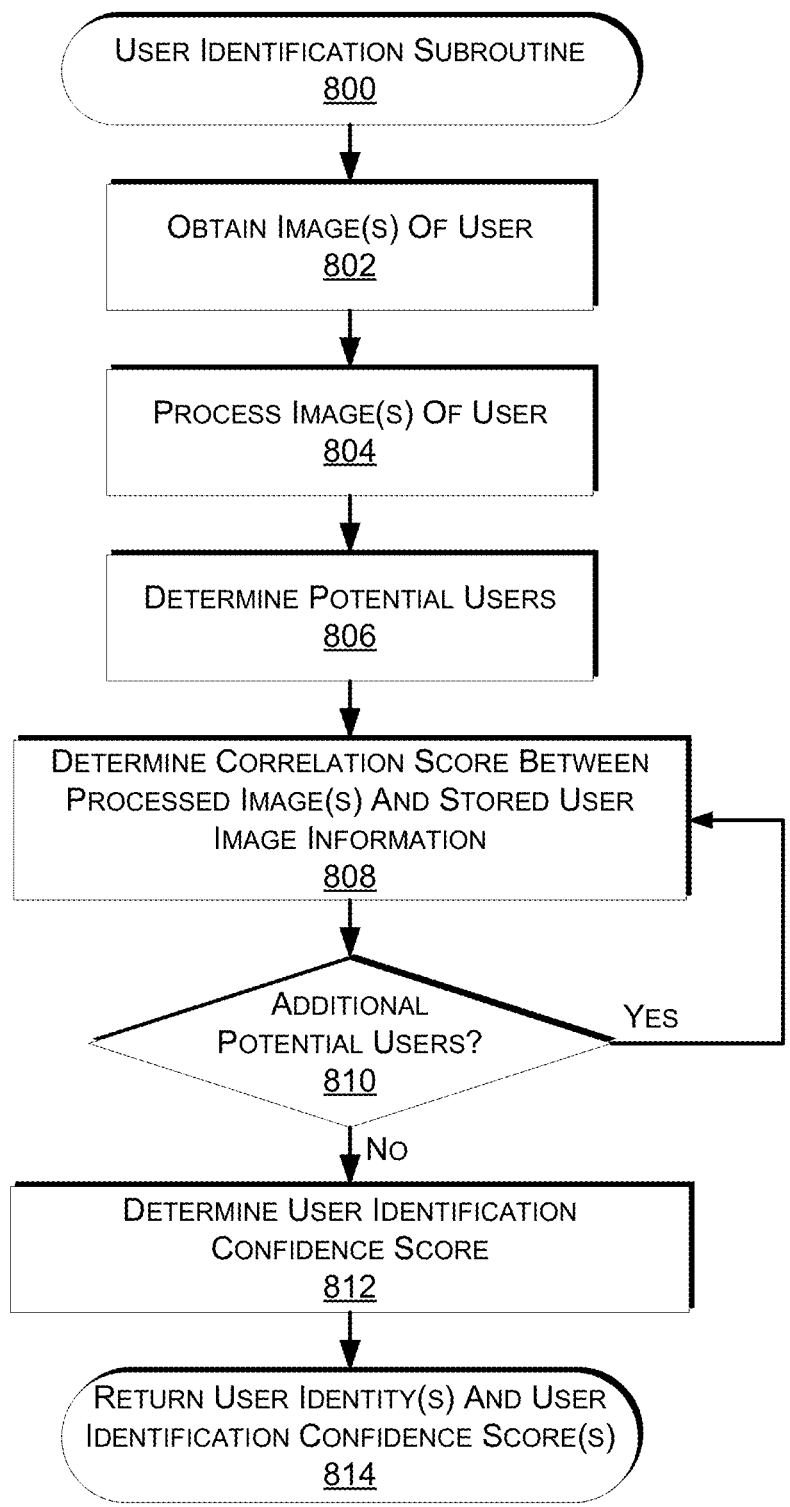
FIG. 8 is a flow diagram of an example user identification subroutine, according to one implementation.

FIG. 8 is a flow diagram of an example user identification subroutine 800, according to one implementation. The example subroutine 800 begins by obtaining one or more images of the user, as in 802. Once obtained, the images are processed, as in 804. Various techniques may be used to process the images. For example, image capture and facial and/or feature recognition may be used to process the image and obtain processed user image information. In some implementations, distinguishing features of the user may be detected and included as part of the processed user image information. For example, as discussed above, if the user is wearing a bright colored shirt, has a tattoo, is wearing a hat, etc., any of those distinguishing features may be detected and included in the processed user image information.

In addition to processing the images, one or more potential users are determined, as in 806. For example, as discussed above, if the inventory management system identifies users when they first enter the materials handling facility and monitors the locations of the users while they move about the materials handling facility, potential users may be limited to only those within a defined distance of the occurrence of the event. For example, if the event occurs in an aisle, users located in that aisle may be determined to be potential users. Likewise, if the users are associated with one or more active tags, potential users may be limited to those for which an active tag reader near the location of the event can detect their active tags. In still another example, potential users may be limited based on the action involved in the event and/or the time between different events. For example, if a prior event included a pick of item A from an inventory location by User 1 and the next event includes a place of item A to the inventory location and the events are only a few moments apart, the example subroutine 800 may consider the prior event to determine the potential users, in this case User 1. In still another example, if the action of an event relates to a pick from a tote or a place into a tote, the user associated with the tote may be considered when determining potential users. For each potential user, user information may be obtained from the user profile data store 1117 (FIG. 11), including the user pattern information determined when the user arrived at the materials handling facility and was first identified. User information may include stored user image information representative of the user, etc.

For each potential user, a correlation score between processed user image information and the stored user information obtained from the user profile data store is determined, as in 808. For example, features of the processed user image information may be compared to the stored user information and a correlation score determined that identifies how strongly (or how close) the features of the processed user image information correspond to the stored user information. After determining a correlation score for a potential user, a determination is made as to whether additional potential users remain for which a correlation score is to be determined, as in 810. If additional potential users remain, the example subroutine returns to block 808 and continues.

However, if it is determined that additional potential users do not remain, a user identification confidence score is determined for the potential user having the highest correlation score, as in 812. In some implementations, the user identification confidence score may be based on a ratio between the highest correlation scores of the potential users. For example, if the three highest correlation scores for potential users are 98% correlated for User 1, 22% correlated for User 2 and 20% correlated for user 3, the user identification confidence score will be high because there is a high correlation and a large ratio between each of the highest correlation score. In comparison, if the three highest correlation scores for potential users are 95% for User 1, 94% for User 2 and 93% for User 3, even though there is a high correlation, the user identification confidence score will be low because there is a small ratio between the highest correlation scores. In such an example, any of the three users (User 1, User 2, User 3) are likely to be the actual user involved in the event.

Upon determining the user identification confidence score, the example subroutine 800 returns the user identifier corresponding to the highest correlation score and returns the determined user identification confidence score, as in 814. In some implementations, the example subroutine may return multiple user identifiers, such as the three user identifiers having the three highest correlation scores.

Figure 9:
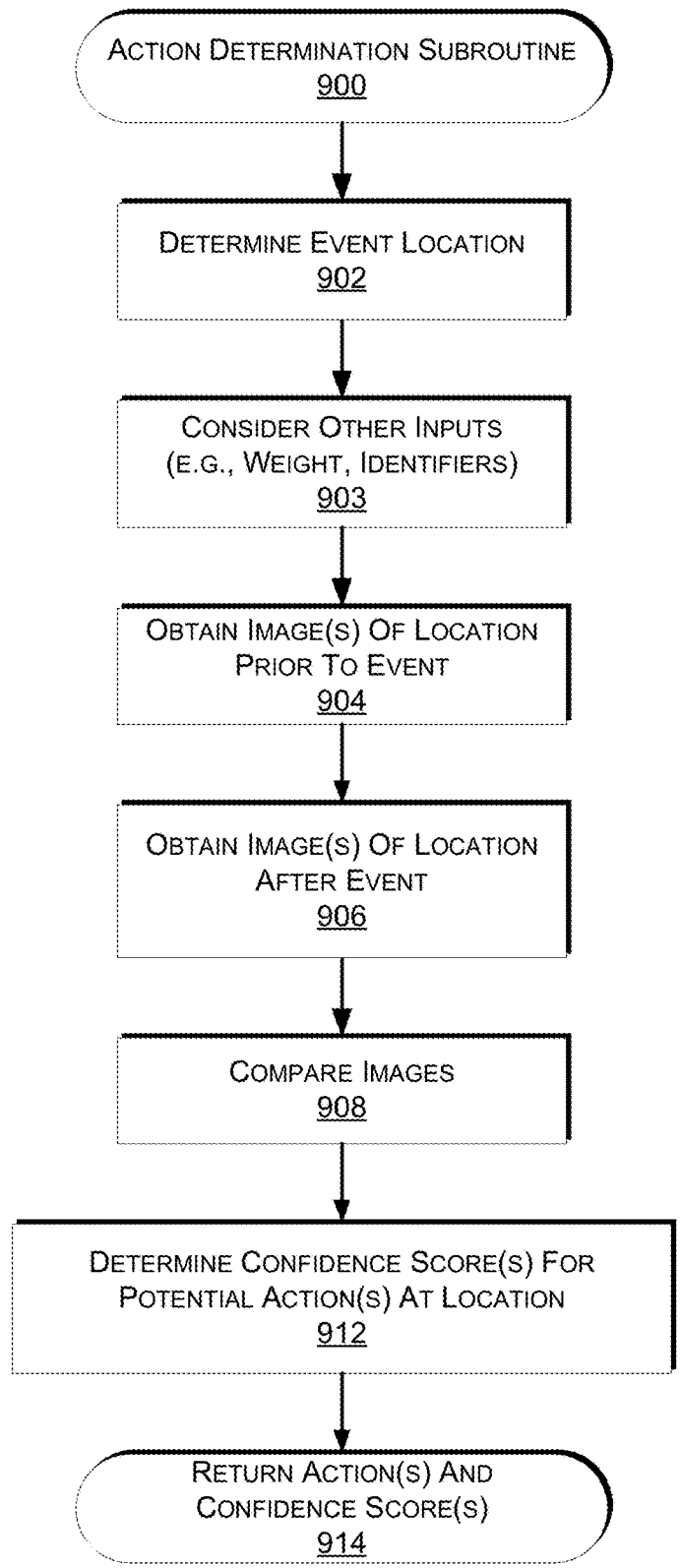
FIG. 9 is a flow diagram of an example action determination subroutine, according to one implementation.

FIG. 9 is a flow diagram of an example action determination subroutine 900, according to one implementation. The example subroutine 900 begins by determining an event location, as in 902. In the examples discussed herein, events either occur at an inventory location or at a tote. In other implementations, an event may occur at another location within the materials handling facility. The location of the event may be determined using a variety of techniques and/or inputs. For example, one or more input devices may detect the event and based on the location of those devices the location of the event can be determined. For example, if a scale or pressure sensor located at an inventory location detects a weight change, it may be determined that the event occurred at the inventory location where the weight change is detected. As another example, if an active tag of an item is detected within a tote, it may be determined that the event occurred at the location of the tote.

In addition to determining the location of the event, the one or more inputs may also be used as a factor in determining actions and/or confidence scores, as in 903. For example, if a scale, pressure sensor and/or other weight determining element detected a change in a weight at the location, the change in the weight may also be considered in determining if the action was a pick or a place. If the weight at an inventory location is determined to have increased, the detected weight increase may be considered as a factor in determining a confidence score that an action of an item place was performed. Similarly, if a weight determining element at the location determined that the weight at the location decreased, the decrease in weight may be used as a factor in determining that the action was an item pick. Other inputs that may be considered in determining actions and/or confidence scores may include, but are not limited to, active tags (e.g., RFID), visual tags (e.g., barcodes, QR codes, bokodes), photodiodes, and/or auto-facing units. For example, in some implementations, an item may include an active and/or visual tag that may be detected when an event occurs. That detected tag may be utilized to assist in identifying the item and/or action. Similarly, a user may possess an active and/or visual tag that may be detected and used to assist in identifying the user involved in the event. Photodiodes may be included on a shelf of an inventory location (and/or in a tote) and a change in light detected by the photodiodes may be used to assist in determining the item and/or action involved in the event. An auto facing unit may control the location of items in the unit such that when one item is removed another item is moved to the front of the unit to replace the removed item. When an item is picked or placed from the auto facing unit, the change in position of the items may be used to assist in determining the action and/or item involved in the event.

One or more images of the location prior to the event may also be obtained, as in 904. In some implementations, images and/or video of inventory locations, totes, etc., may be periodically obtained and maintained by the inventory management system for a period of time. If an event is detected, images of the location where the event occurred may be obtained that represent the location before the event occurrence. Likewise, one or more images of the location of the event after the event occurrence may also be obtained, as in 906. The set of images may then be processed and compared, as in 908. For example, one or more image processing techniques, such as feature extraction, object recognition, edge detection etc., may be performed and the results of the processed images compared to identify a difference between the images. The comparison may be used to determine if an item was placed at the location or picked from the location. For example, if edge detection is performed on each image and the results compared, it can be determined if an item was added or removed from the location.

Based on the compared images and the other inputs, an action determination confidence score for each potential action at the determined location is determined, as in 912. For example, if the location is determined to be a tote, an action determination confidence score for an action of an item pick from the tote is determined and an action determination confidence score for an action of an item place into the tote is determined. Finally, the action with the highest action determination confidence score and the determined action determination confidence score are returned, as in 914. In some implementations, the action determination subroutine may return multiple actions as potentially corresponding to the event. When returning multiple potential actions, a probability score or likelihood may be returned with each determined action.

Figure 10:
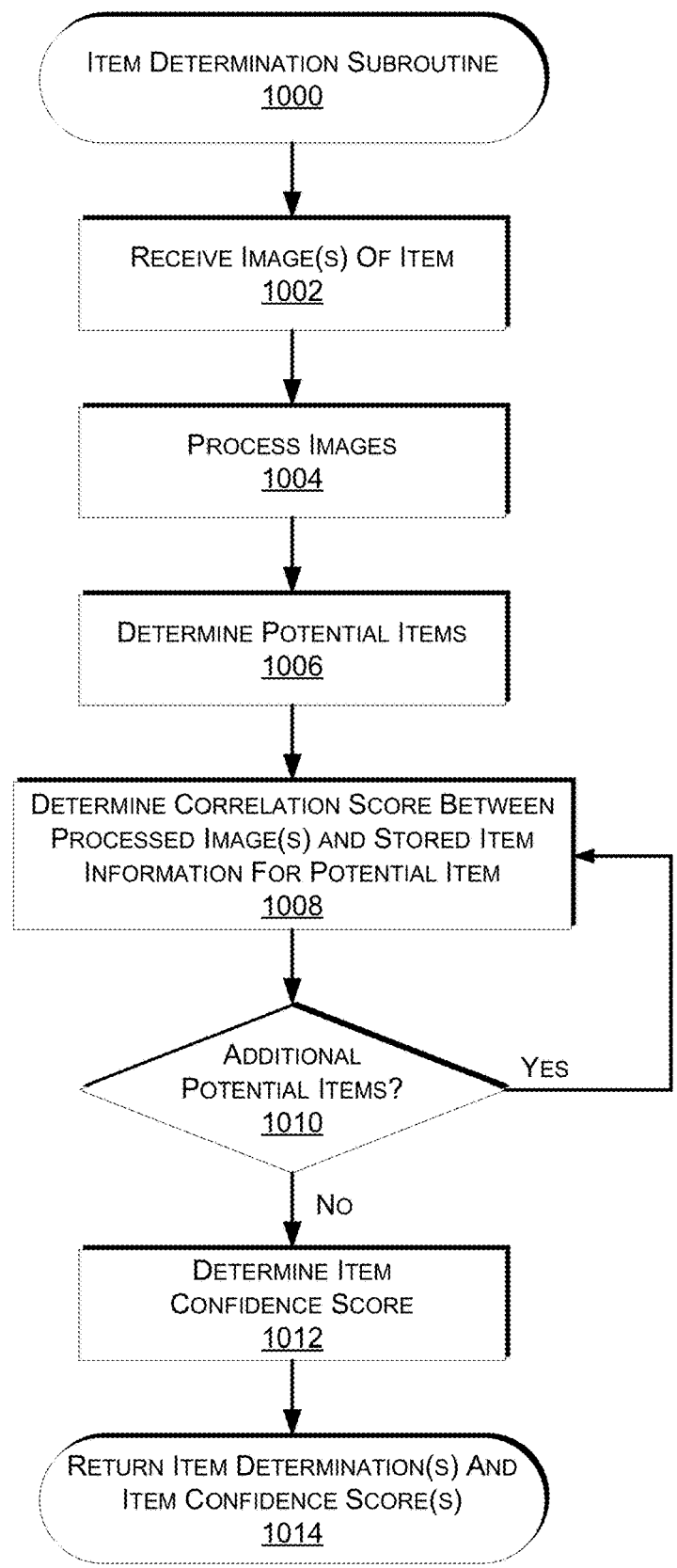
FIG. 10 is a flow diagram of an example item determination subroutine, according to one implementation.

FIG. 10 is a flow diagram of an example item determination subroutine 1000, according to one implementation. The example subroutine 1000 begins upon receipt of one or more captured images of an item, as in 1002. A received image is processed to identify features of an item in the image, as in 1004. In some implementations, the image may be processed in grey-scale to identify features. Features of an item may be anything or a combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. As such, each image of an item may include multiple and/or different features. Processing of the image may also include determining an arrangement of the identified features. The arrangement may be a two dimensional relationship of the features with respect to each other as captured in the image. In other implementations, the arrangement of features may be a three-dimensional arrangement with respect to each other as captured in the image.

In addition to processing the image of the item, one or more potential items may be determined, as in 1006. For example, the inventory management system may maintain inventory location information for each item in the materials handling facility. Likewise, an item identifier list may be maintained by the inventory management system for each user, identifying the items included in the tote associated with the user. Based on the location of the event, the potential items may be limited to just those within a defined distance of the event location and/or just those that could potentially have been involved in the action determined for the event. For example, if the event is at an inventory location and the action is determined to be a pick of an item from the inventory location, the potential items may be reduced to only those items associated with the inventory location. As another example, if the action is a pick from a tote associated with a user, the potential items may be reduced to only those included in the tote associated with the user. In still another example, potential items may be limited based on the item involved in a prior event and/or the time between different events. For example, if a prior event included a pick of item A from an inventory location by User 1 and the next event includes a place of item A to the inventory location and the events are only a few moments apart, the example subroutine 1000 may consider the prior event to determine the potential items, in this case Item A.

Figure 11:
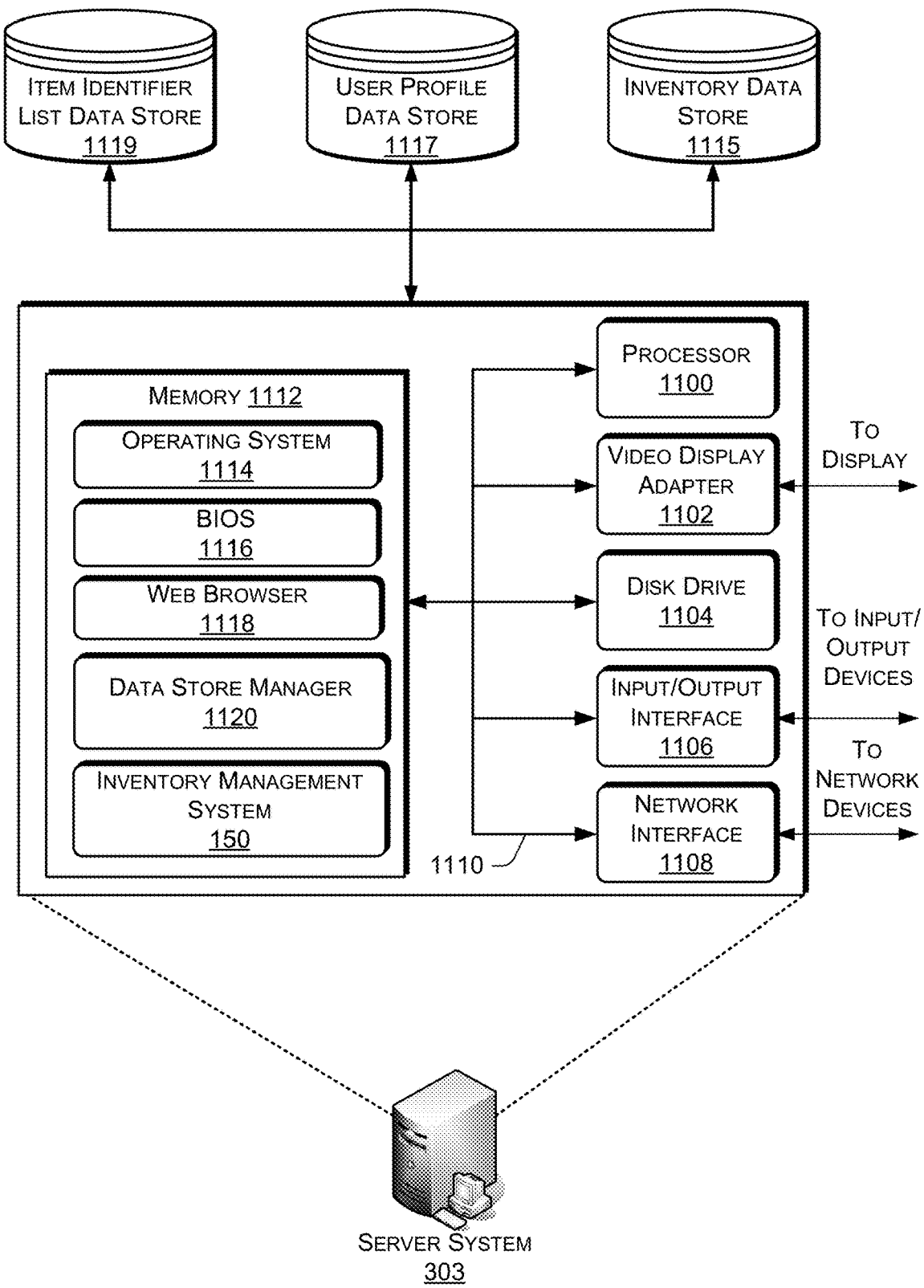
FIG. 11 is a block diagram of an illustrative implementation of a server system that may be used with various implementations.

For each potential item, item information may be obtained from the inventory data store 1115 (FIG. 11). Item information may include stored item image information representative of the item, etc. For example, as items are added to inventory, one or more images of the known items may be obtained, processed and item image information stored in the inventory data store 1115 and associated with the item.

For each potential item, a correlation score between processed item image information and the stored item image information obtained from the inventory data store is determined, as in 1008. For example, features of the processed item image information and/or the arrangement of those features may be compared to the stored item image information and a correlation score determined that identifies how strongly (or how close) the features of the processed item image information correspond to the stored item image information for the potential item. In some implementations, additional or other inputs may also be considered and the correlation score for a potential item adjusted. For example, if a weight change is detected, an amount of the detected weight change may be compared to the weight associated with the potential item and the correlation score adjusted based on the similarity between the two weights. Likewise, if an identifier (e.g., active tag identifier, passive tag identifier) is detected, it may be determined if the identifier corresponds to the potential item and the correlation score increased or decreased accordingly. In some implementations, the additional and/or other inputs may be considered prior to processing an image. For example, an initial step in the item determination subroutine may include determining the item based on a weight change detected at the inventory location. Based on the inventory location and the weight change, in some implementations, the item may be identifiable without any image processing. In other implementations, the location, weight change and/or other inputs may be a factor in determining the confidence score(s).

After determining a correlation score for a potential item, a determination is made as to whether additional potential items remain for which a correlation score is to be determined, as in 1010. If additional potential items remain, the example subroutine returns to block 1008 and continues.

However, if it is determined that additional potential items do not remain, an item determination confidence score is determined for the potential item having the highest correlation score, as in 1012. In some implementations, the item determination confidence score may be based on a ratio between the highest correlation scores of the potential items. For example, if the three highest correlation scores for potential items are 98% correlated for Item A, 22% correlated for Item B and 20% correlated for Item C, the item determination confidence score will be high because there is a high correlation and a large ratio between each of the highest correlation scores. In comparison, if the three highest correlation scores for potential items are 95% for Item A, 94% for Item B and 93% for Item C, even though there is a high correlation, the item determination confidence score will be low because there is a small ratio between the highest correlation scores. In such an example, any of the three items (Item A, Item B, Item C) are likely to be the actual item involved in the event.

Upon determining the item determination confidence score, the example subroutine 1000 returns the item identifier corresponding to the highest correlation score and returns the determined item determination confidence score, as in 1014. In some implementations, the example subroutine may return multiple item identifiers, such as the three item identifiers having the three highest correlation scores.

FIG. 11 is a pictorial diagram of an illustrative implementation of a server system, such as the server system 303 that may be used in the implementations described herein. The server system 303 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 303 to monitor and configure operation of the server system 303. The input/output interface 1106 likewise communicates with external input/output devices not shown in FIG. 11, such as a mouse, keyboard, scanner, or other input and output devices that can be operated by an operator of the server system 303. The network interface 1108 includes hardware, software, or any combination thereof, to communicate with other computing devices. For example, the network interface 1108 may be configured to provide communications between the server system 303 and other computing devices via the network 302, as shown in FIG. 3.

The memory 1112 generally comprises random access memory (RAM), read-only memory (ROM), flash memory, and/or other volatile or permanent memory. The memory 1112 is shown storing an operating system 1114 for controlling the operation of the server system 303. A binary input/output system (BIOS) 1116 for controlling the low-level operation of the server system 303 is also stored in the memory 1112.

The memory 1112 additionally stores program code and data for providing network services that allow the inventory management system 150 to identify users and/or items within the materials handling facility. Accordingly, the memory 1112 may store a browser application 1118. The browser application 1118 comprises computer executable instructions, that, when executed by the processor 1100, generate or otherwise obtain configurable markup documents such as Web pages. The browser application 1118 communicates with a data store manager application 1120 to facilitate data exchange between the inventory data store 1115, the user profile data store 1117 and/or the item identifier list data store 1119.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 1115-1119 as needed to execute aspects of the inventory management system 150.

The data stores 1115-1119 can include several separate data tables, databases or other data storage mechanisms and media for storing data relating to a particular aspect. For example, the data stores 1115-1119 illustrated include mechanisms for maintaining inventory information (e.g., item locations, images of item when properly positioned, item features), user profile information, item lists associated with users, etc., which can be used to provide confirmations to a user that the inventory management system has properly identified an item and/or the action performed by the user.

It should be understood that there can be many other aspects that may be stored in the data stores 1115-1119. The data stores 1115-1119 are operable, through logic associated therewith, to receive instructions from the server system 303 and obtain, update or otherwise process data in response thereto.

The memory 1112 may also include the inventory management system 150, discussed above. The inventory management system 150 may be executable by the processor 1100 to implement one or more of the functions of the server system 303. In one implementation, the inventory management system 150 may represent instructions embodied in one or more software programs stored in the memory 1112. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   under control of one or more computing devices configured with executable instructions, storing event image information corresponding to an event performed by a user
   while the user is located in a materials handling facility;
      determining, for each of a plurality of event aspects corresponding to the event, a respective confidence score;
      determining that at least one of the respective confidence scores does not exceed a threshold;
      in response to determining that at least one of the respective confidence scores does not exceed the threshold, determining that the event image information is to be retained;
      determining a retention period for the event image information;
      determining that the retention period has expired; and
      deleting the event image information.

2. The method of claim 1, wherein determining that the event image information is to be retained is further based at least in part on a user profile associated with the user identifying that the user may later dispute the event.

3. The method of claim 1, wherein determining that the event image information is to be retained is further based at least in part on an item involved in the event.

4. The method of claim 3, wherein the item is an item previously associated with an event dispute from the user.

5. The method of claim 1, wherein the retention period is at least one of a defined period of time based on a user profile associated with the user, a return period associated with an item involved in the event, or a defined period of time associated with the materials handling facility.

6. The method of claim 1, further comprising:
   prior to determining that the retention period has expired, receiving an event dispute corresponding to the event; and
   utilizing the event image information to resolve the event dispute.

7. The method of claim 6, wherein the event dispute is received after the user has departed the materials handling facility.

8. The method of claim 1, further comprising:
   aggregating event information associated with each of a plurality of events to produce aggregated event information representative of the plurality of events, wherein the plurality of events includes the event;
   determining, based at least in part on the aggregated event information a commonality between the plurality of events;
   determining a source of the commonality; and
   providing for consideration the source of the commonality.

9. The method of claim 8, further comprising:
anonymizing the aggregated event information to remove user identifying information from the aggregated event information.

10. A computing system, comprising:
one or more processors; and
a memory storing program instructions that when executed by the one or more processors cause the one or more processors to at least:
store event image information corresponding to an event performed by a user while the user is located in a materials handling facility;
determine, for each of a plurality of event aspects corresponding to the event, a respective confidence score;
determine that at least one of the respective confidence scores does not exceed a threshold;
in response to a determination that at least one of the respective confidence scores does not exceed the threshold, determine that the event image information is to be retained;
determine a retention period for the event image information;
determine that the retention period has expired; and
discard the event image information.

11. The computing system of claim 10, wherein the determination that event image information corresponding to the event performed by the user is to be retained is further based at least in part on a user profile associated with the user identifying that the user may later dispute the event.

12. The computing system of claim 10, wherein the determination that event image information corresponding to the event performed by the user is to be retained is further based at least in part on an item involved in the event.

13. The computing system of claim 12, wherein the item is an item previously associated with an event dispute.

14. The computing system of claim 10, wherein the retention period is at least one of a defined period of time based on a user profile associated with the user, a return period associated with an item involved in the event, or a defined period of time associated with the materials handling facility.

15. The computing system of claim 10, wherein the program instructions when executed by the one or more processors further cause the one or more processors to at least:
prior to a determination that the retention period has expired, receive an event dispute corresponding to the event; and
utilize the event image information to resolve the event dispute.

16. The computing system of claim 15, wherein the event dispute is received after the user has departed the materials handling facility.

17. A method, comprising:
determining that event image information corresponding to an event performed by a user while the user is located in a materials handling facility is to be retained;
determining, for each of a plurality of event aspects corresponding to the event, a respective confidence score;
determining that at least one of the respective confidence scores does not exceed a threshold;
in response to determining that at least one of the respective confidence scores does not exceed the threshold, determining that the event image information is to be retained;
determining a retention period for the event image information;
storing the event image information during the retention period;
determining that the retention period has expired; and
discarding the event image information.

18. The method of claim 17, wherein the plurality of event aspects include at least one of the user involved in the event, an item involved in the event, or an action performed as part of the event.

19. The method of claim 17, wherein determining that the event image information is to be retained is further based at least in part on an item involved in the event, an action involved in the event, or the user involved in the event.

20. The method of claim 17, further comprising:
prior to determining that the retention period has expired, receiving an event dispute corresponding to the event; and
utilizing the event image information to resolve the event dispute.

* * * * *